(12) United States Patent
Fleischheuer et al.

(10) Patent No.: US 9,321,382 B2
(45) Date of Patent: Apr. 26, 2016

(54) CONNECTION ELEMENT OF THE HEADREST POLES ON A SEAT STRUCTURE

(75) Inventors: Simon Fleischheuer, Mülheim an der Ruhr (DE); Harald Mund, Solingen (DE); Robin Ndagijimana, Neuss (DE); Jutta Klingspohn, Moosach (DE); James Abraham, Köln (DE); Hans-Georg Werner, Langenfeld (DE); Wolfgang Pellenz, Meckenheim (DE); Nils Frisse, Cologne (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 38 days.

(21) Appl. No.: 14/240,162

(22) PCT Filed: Aug. 2, 2012

(86) PCT No.: PCT/EP2012/003294
§ 371 (c)(1),
(2), (4) Date: May 20, 2014

(87) PCT Pub. No.: WO2013/026524
PCT Pub. Date: Feb. 28, 2013

(65) Prior Publication Data
US 2014/0252839 A1 Sep. 11, 2014

(30) Foreign Application Priority Data

Aug. 24, 2011 (DE) .......................... 10 2011 111 057
Oct. 12, 2011 (DE) .......................... 10 2011 115 714

(51) Int. Cl.
*B60N 2/44* (2006.01)
*B60N 2/48* (2006.01)
*B60N 2/68* (2006.01)

(52) U.S. Cl.
CPC *B60N 2/48* (2013.01); *B60N 2/686* (2013.01); *B60N 2/682* (2013.01); *B60N 2002/4897* (2013.01)

(58) Field of Classification Search
CPC ........ B60N 2/682; B60N 2/68; B60N 2/4808; B60N 2002/4897; B60N 2/48; B60N 2/686
USPC .......................... 297/452.18, 410, 391, 463.1
See application file for complete search history.

(56) References Cited

U.S. PATENT DOCUMENTS 5,788,250 A * 8/1998 Masters et al. ................ 297/410
6,948,773 B2 * 9/2005 Yetukuri et al. .............. 297/410

(Continued)

FOREIGN PATENT DOCUMENTS

DE  10 2004 043 860 A1  3/2006
DE  10 2005 019 946 A1  11/2006

(Continued)

OTHER PUBLICATIONS

International Preliminary Report on Patentability in PCT/EP2012/003294.

(Continued)

*Primary Examiner* — Milton Nelson, Jr.
(74) *Attorney, Agent, or Firm* — Foley & Lardner LLP

(57) ABSTRACT

A connection element of a headrest pole on a seat structure of a motor vehicle seat, includes a connection profile which receives the headrest pole and/or a headrest pole housing. The connection profile protrudes through a lateral wall of the seat structure.

9 Claims, 2 Drawing Sheets

(56) References Cited

U.S. PATENT DOCUMENTS

| | | |
|---|---|---|
| 2006/0175887 A1* | 8/2006 | Behrens .................. 297/452.18 |
| 2009/0196432 A1 | 8/2009 | Close et al. |
| 2011/0030438 A1* | 2/2011 | Maier et al. ..................... 72/254 |

FOREIGN PATENT DOCUMENTS

| | | |
|---|---|---|
| DE | 10 2006 061 638 A1 | 7/2008 |
| DE | 10 2008 038 850 A1 | 2/2010 |
| EP | 2546099 A1 * | 1/2013 |
| JP | 02-074850 U | 6/1990 |
| WO | WO 2010/017856 A1 | 2/2010 |

OTHER PUBLICATIONS

International Search Report mailed Nov. 2, 2012 in International Appl. No. PCT/EP2012/003294 (2 pgs.).

Office Action issued in co-pending Japanese Application No. 2014-526406 dated Jan. 20, 2015 and English translation, 4 pages.

\* cited by examiner

CONNECTION ELEMENT OF THE HEADREST POLES ON A SEAT STRUCTURE

CROSS REFERENCE TO RELATED APPLICATIONS

This application is a US national phase entry of International Application No. PCT/EP2012/003294, filed Aug. 2, 2012, which claims priority to German Patent Application No. 10 2011 111 057.0, filed Aug. 24, 2011 and German Patent Application No. 10 2011 115 714.3, filed Oct. 12, 2011, the entire disclosures of all of which are incorporated herein by reference.

The present invention relates to a connection element of the headrest poles on a seat structure.

According to the current prior art, headrests are connected, for example, via plastic housings in the upper region of the seat structure. In this case, the headrest poles are inserted into the housings and fixed, for example, via a latching mechanism. In the case of a steel tube frame or a structure consisting of steel profiles, the plastic housings are fixed via metal tubes welded thereon. In this case, the metal tubes form the bearing surface for the plastic housings. The two components exist both as round and rectangular variants. For joining metal tubes or profiles in which at least one consists of a non-metal or a non-ferrous metal, a welding method is unsuitable.

It was, therefore, the object of the present invention to provide a connection element which permits plastic housings for the headrest poles to be attached to the seat structure of a motor vehicle seat.

The object is achieved by at least one connection element of a headrest pole on the seat structure of a motor vehicle seat, said connection element having a connection profile which receives the headrest pole and/or a headrest pole housing, wherein the connection profile protrudes through a lateral wall of the seat structure.

According to the invention, the connection for the headrest pole housing or the headrest pole consists of a connection element, for example consisting of plastic, steel or a non-ferrous metal, such as for example aluminum. Said connection element has a connection profile which in each case at least partially receives a headrest pole and/or a headrest pole housing and which protrudes through a lateral wall of the seat structure. To this end, in particular, the seat structure has an upper crossmember with at least one, preferably two or more recesses through which the, for example, stamped-out connection profile(s) of the connection element in each case is (are) passed through at least partially. Subsequently, the connection element is joined to the seat structure of the backrest which is manufactured, for example, as a rolled profile, as a continuous casting, as a pressed part or bent part, in a positive and/or non-positive connection and/or connected together by a material connection, in particular by an adhesively bonded connection. By a fixing means preferably integrated in the connection element, the connection element may be held or fixed in its position until the material connection is complete, for example until the adhesive is cured. Preferably, the seat structure receives the entire connection element except for the connection profile(s) so that said connection element does not protrude from the seat structure, apart for the connection profile(s).

Preferably, the connection element has at least one joining surface. By means of said joining surface, the connection element is preferably connected by a material connection to the structure of the motor vehicle seat. Preferably, a joining surface is provided between two connection profiles. Further preferably, a joining surface completely encloses a connection profile. Further preferably, in each case a joining surface is arranged to the right and to the left of a connection profile.

Preferably, the connection element is extruded and in each case is particularly preferably cut to the desired length.

The connection element according to the invention may be connected by a non-positive and/or material connection to the seat structure.

Preferably, the structure of the vehicle seat, in particular the backrest thereof, comprises one or more recesses. Said recesses may be retrospectively incorporated in the structure or integrally formed therein during the manufacture thereof. Preferably, the connection profile of the connection element cooperates positively and/or non-positively with said recess in the structure of a motor vehicle seat. Preferably the recess is cut out or stamped out of the structure of the motor vehicle seat.

Preferably, the connection element according to the invention is a plastic part which, for example, is extruded, cast, molded or produced by injection-molding.

Preferably, the connection element is adhesively bonded at one or more points to the structure of the motor vehicle seat.

The invention is described hereinafter with reference to FIGS. 1 to 7. Said explanations are provided merely by way of example and do not limit the general inventive idea.

Figure 1:
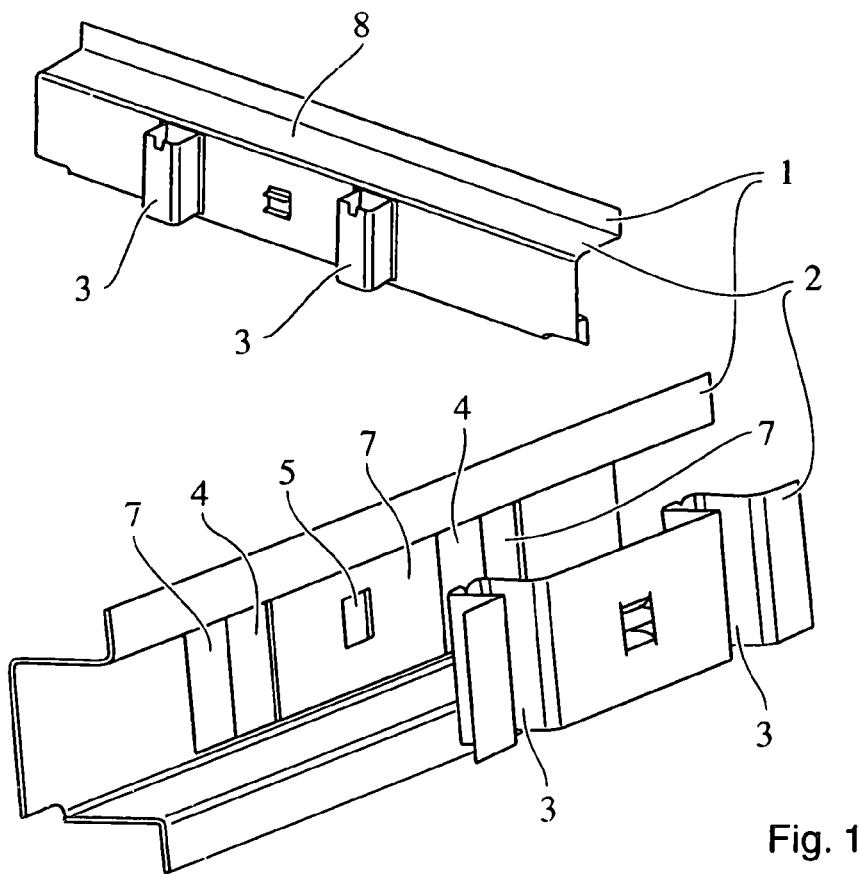
FIGS. 1-4 show the crossmember and the connection element in different views.
Figure 2:
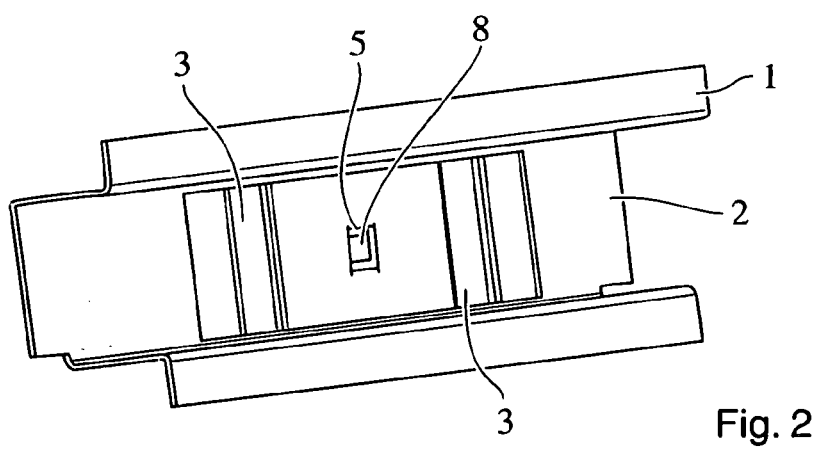

FIG. 1 partially shows the structure 1 of a motor vehicle seat, in this case the upper crossmember 1 of the frame of the structure of a backrest which in this case is configured as a U-shaped profile, which at the ends of the arms of the U-shape in each case has a connecting flange. Said crossmember 1 has two recesses 4 through which in each case a connection profile 3 of the connection element 2 is inserted. The recess 4 is incorporated, for example, in the structure of the motor vehicle seat by stamping. In this case, the recess 4 extends only through a lateral wall of the structure of the motor vehicle seat. Moreover, the crossmember preferably has a recess 5 which cooperates in a latching manner with a latching means 8 which is also provided on the connection element, preferably integrally. Moreover, the connection element 2 which in the present case consists of plastic and may be provided as an injection-molded/continuously cast or thermoplastic molded element is shown in FIG. 1. In the present case, said connection element 2 has two connection profiles 3 with a square cross section in this case. Moreover, the connection element has a fixing means 8, in this case a latching element 8 which in the present case consists of two side-pieces which are provided to be resilient. On its side facing the connection element 2, the cross member 1 and/or the connection element 2 in each case have at least one, in this case three, joining surfaces 7 in the form of adhesive surfaces by means of which the crossmember 1 and the connection element 2 are connected together by a material connection. For assembly, the connection profiles 3 are inserted through the recesses 4 and the connection element 2 is pressed against the crossmember 1 until the latching element 8 engages in the recess 5. The latching element 8 fixes the connection element 2 to the crossmember 1 until the adhesive between the crossmember and the connection element is cured.

Figures 3, 4:
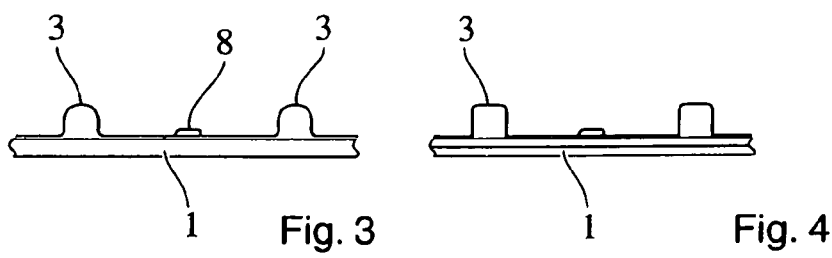

It may be seen in particular in FIGS. 3 and 4 that the connection profiles 3 may be provided as round or angular U-shaped profiles. The person skilled in the art understands that any other cross section of the connection profile is also conceivable.

Figure 5:
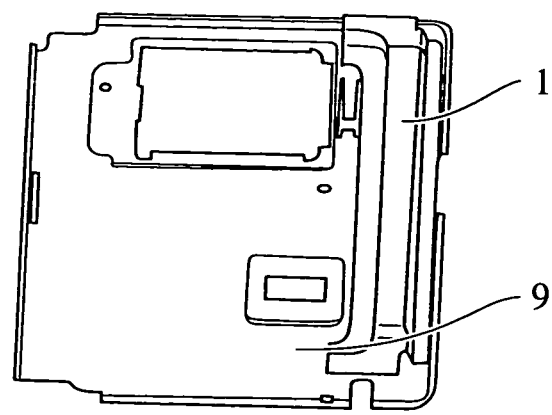
FIGS. 5-7 show a further embodiment according to the invention.
Figure 6:
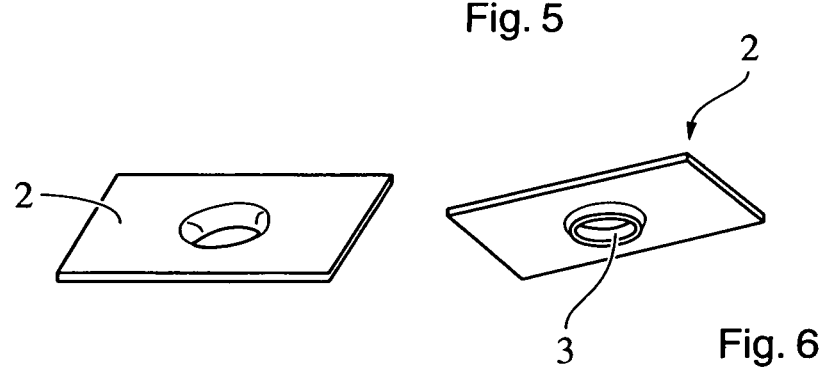
Figure 7:
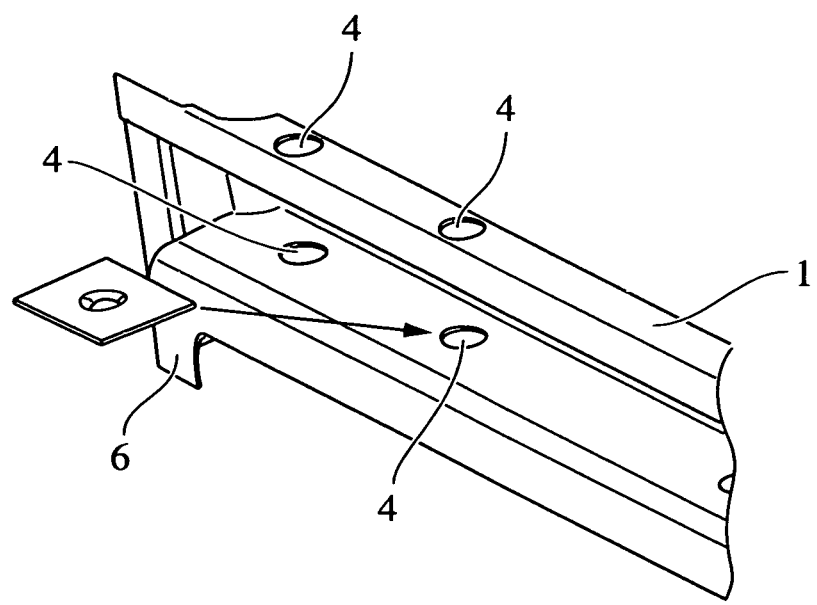

FIGS. 5-7 show a further embodiment of the present invention. The structure 9 of the motor vehicle seat, in this case the frame 9 of a backrest, has a crossmember, in this case made of aluminum, which, as in particular may be derived from FIG. 7, has four recesses 4 in which one respective headrest pole housing and/or a headrest pole may be guided in pairs. At least two recesses 4 located in one plane, preferably all four recesses 4, have one respective connection element 2 which in the present case is of plate-like configuration and is provided with a through-passage 3, i.e. the connection element 2 is crimped in the region of its opening. The through-passage 3 is inserted into the recess 4 and protrudes therefrom. The surface of the connection means opposing the crossmember is connected thereto by a material connection, for example by adhesive bonding. Alternatively or additionally, a non-positive and/or positive connection is present between the through-passage 3 and the recess 4. In the embodiment according to FIG. 7, a connecting flange 6 is provided on the connection element 2 in order to provide an additional connecting surface and/or positioning surface 6 to the connection element 3.

LIST OF REFERENCE NUMERALS

1 Structure of the motor vehicle seat, crossmember
2 Connection element
3 Connection profile, stamped connection profile
4 Recess for the connection profile
5 Recess for a latching element
6 Connecting flange, connecting surface and/or positioning surface
7 Joining surface
8 Fixing means, latching element
9 Structure of the motor vehicle seat, frame of a backrest

The invention claimed is:

1. A connection element for at least one of a headrest pole and/or a headrest pole housing on a seat structure of a motor vehicle seat, said connection element comprising:
   a connection element body; and
   a connection profile that is configured to receive at least one of the headrest pole and/or the headrest pole housing,
   wherein the connection profile is stamped out of the connection element body such that the connection profile has a square cross section,
   wherein the connection profile is configured to be inserted through a recess in the seat structure in order to protrude when the connection element body is pressed against the seat structure of the motor vehicle seat,
   wherein the connection profile is configured to form a through-passage with a portion of the seat structure when the connection profile is inserted through the recess.

2. The connection element as claimed in claim 1, further comprising at least one joining surface.

3. The connection element as claimed in claim 1, further comprising a fixing mechanism that is configured to fix the connection element to the seat structure.

4. The connection element as claimed in claim 1, wherein the connection element is extruded.

5. The connection element as claimed in claim 1, wherein the connection element is configured to be connected by at least one of a non-positive and/or material connection to the seat structure.

6. The connection element as claimed in claim 1, wherein, when the connection profile is inserted through the recess, the connection element body is pressed against a first side of the lateral wall and the connection profile forms the through-passage on a second side of the lateral wall such that, when at least one of the headrest pole and/or the headrest pole housing is received in the connection profile, the at least one of the headrest pole and/or the headrest pole housing extends along the second side of the lateral wall and does not extend along the first side of the lateral wall.

7. The connection element as claimed in claim 1, wherein the connection profile is configured to cooperate at least one of positively and/or non-positively with the recess in the structure of the motor vehicle seat.

8. The connection element as claimed in claim 1, wherein the connection element is configured to be adhesively bonded to the structure of the motor vehicle seat.

9. The connection element as claimed in claim 1, wherein the connection element is a plastic part.

* * * * *